United States Patent [19]

Barnum et al.

[11] Patent Number: 5,171,817
[45] Date of Patent: Dec. 15, 1992

[54] ORGANOSILICON COMPOSITIONS CONTAINING SILOXANE ELASTOMERS

[75] Inventors: Paquita E. Barnum, Newark; Richard L. Brady, Wilmington, both of Del.

[73] Assignee: Hercules Incorporated, Wilmington, Del.

[21] Appl. No.: 685,360

[22] Filed: Apr. 15, 1991

[51] Int. Cl.$^5$ .............................. C08G 77/06
[52] U.S. Cl. ...................... 528/15; 528/31; 528/32; 525/478; 525/479
[58] Field of Search .................. 525/478, 479; 528/15, 528/31, 32

[56] References Cited

U.S. PATENT DOCUMENTS

| | | | |
|---|---|---|---|
| 4,657,981 | 4/1987 | Klosiewicz | 525/211 |
| 4,855,378 | 8/1989 | Pradl et al. | 528/26 |
| 4,898,689 | 2/1990 | Hamada et al. | 524/495 |
| 4,900,779 | 2/1990 | Leibfried | 524/862 |
| 4,902,731 | 2/1990 | Leibfried | 523/222 |
| 4,911,974 | 3/1990 | Shimizu et al. | 428/447 |
| 5,008,360 | 4/1991 | Bard et al. | 528/25 |
| 5,013,809 | 5/1991 | Leibfried | 524/862 |
| 5,025,048 | 6/1991 | Burnier | 524/99 |
| 5,068,303 | 11/1991 | Bard et al. | 528/25 |
| 5,077,134 | 12/1991 | Leibfried | 428/447 |
| 5,118,735 | 6/1992 | Burnier | 524/99 |

Primary Examiner—Melvyn I. Marquis
Assistant Examiner—Karen A. Hellender
Attorney, Agent, or Firm—Mark D. Kuller

[57] ABSTRACT

This invention is directed to a composition comprising (A) a continuous phase of (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted to hydrocarbon residues derived from polycyclic polyenes having at least two non-aromatic, non-conjugated carbon-carbon double bonds in their rings; and (B) a discontinuous phase of a low molecular weight siloxane elastomer having at least two hydrosilation reactable carbon-carbon double bonds.

21 Claims, 1 Drawing Sheet

ORGANOSILICON COMPOSITIONS CONTAINING SILOXANE ELASTOMERS

This invention is directed to organosilicon polymers and prepolymers comprised of (a) hydrocarbon residues derived from polycyclic polyenes and (b) residues derived from linear poly(organosiloxan)s, cyclic polysiloxanes or tetrahedral siloxysilanes.

BACKGROUND OF THE INVENTION

Leibfried, in U.S. Pat. Nos. 4,900,779 and 4,902,731 and U.S. patent application Ser. Nos. 07/419,429 (filed Oct. 10, 1989, now U.S. Pat. No. 5,013,809) and 07/419,430 (filed Oct. 10, 1989, now U.S. Pat. No. 5,077,134) and Bard and Burnier, in U.S. patent application Ser. No. 07/422,214 (filed Oct. 16, 1989, now U.S. Pat. No. 5,008,360), describe cross-linked organosilicon polymers and cross-linkable organosilicon prepolymers comprised of polycyclic hydrocarbon residues and cyclic polysiloxanes or siloxysilane residues linked through carbon to silicon bonds, and processes useful for preparing the same. Cowan, in U.S. Pat. No. 4,877,820, discloses crosslinked or crosslinkable linear poly(organohydrosiloxane) polymers having at least 30% of their ≡SiH groups reacted with hydrocarbon residues derived from polycyclic polyenes. The crosslinked polymers have high glass transition temperatures ($T_g$), low dielectric constant, low moisture absorption and other desirable properties. The polymers and prepolymers are described as useful for electronic applications, such as preparing printed circuit boards (including substantially tack-free prepreg and laminates useful for preparing such circuit boards) and encapsulants, and structural materials.

One major weakness of these polymers is their brittleness. Brittleness can result in cracking.

The inventors have discovered that certain elastomers toughen the polymers and prepolymers, without significantly impacting other properties, such as Tg.

SUMMARY OF THE INVENTION

Accordingly, this invention is directed to a composition comprising (A) a continuous phase of (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted to hydrocarbon residues derived from polycyclic polyenes having at least two non-aromatic, non-conjugated carbon-carbon double bonds in their rings; and (B) a discontinuous phase of a low molecular weight siloxane elastomer having at least two hydrosilation reactable carbon-carbon double bonds.

DETAILED DESCRIPTION OF THE INVENTION

Figure 1:
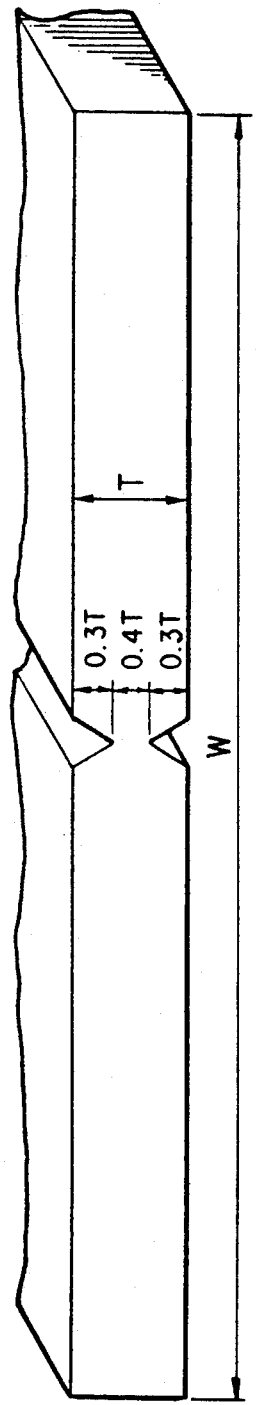
FIG. 1 is an end view of the test samples used in the double torsion test.

Herein, "SiH" is be used to describe hydrosilation reactable ≡SiH groups.

Any cyclic polysiloxane or tetrahedral siloxysilane with two or more hydrogen atoms bound to silicon can be used to form the crosslinked organosilicon polymer or hydrosilation crosslinkable organosilicon prepolymer (A) (i). Cyclic polysiloxanes useful in forming the products of this invention have the general formula:

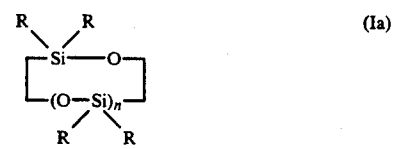
(Ia)

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (Ia) include, e.g., tetra- and penta-methylcyclotetrasiloxanes; tetra-, penta-, hexa- and hepta-methylcylopentasiloxanes; tetra-, penta- and hexa-methylcylohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

The tetrahedral siloxysilanes are represented by the general structural formula:

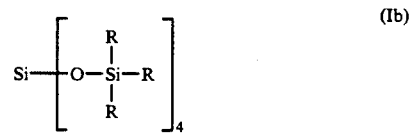
(Ib)

wherein R is as defined above and is hydrogen on at least two of the silicon atoms in the molecule.

Examples of reactants of Formula (Ib) include, e.g., tetrakisdimethylsiloxysilane, tetrakisdiphenylsiloxysilane, and tetrakisdiethylsiloxysilane. The tetrakisimethylsiloxysilane is the best known and preferred species in this group.

Polymers and prepolymers made with cyclic polysiloxanes or tetrahedral siloxysilanes may also contain other hydrosilation reactable polysiloxanes bearing two or more SiH groups. For instance, they may contain linear, short chain SiH terminated polysiloxanes having the general formula:

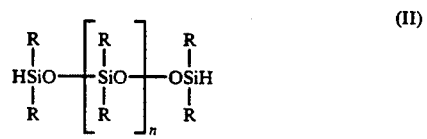
(II)

wherein n is 0 to 10 and R is alkyl or aryl, preferably methyl or phenyl. These linear, short chain SiH terminated polysiloxanes, described by Leibfried in U.S. patent application Ser. Nos. 07/419,429 and 07/419,430

(U.S. Pat. Nos. 5,013,809 and 5,077,134, respectively), supra, impart flexibility to the cured polymers.

The linear poly(organohydrosiloxane) preferably has the general formula:

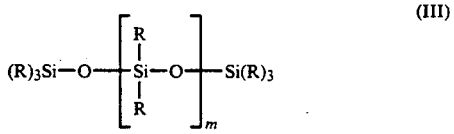

(III)

wherein R is a substituted or unsubstituted, saturated alkyl radical or a substituted or unsubstituted phenyl radical, and about 5% to about 50% of the R's are hydrogen and m is an integer from about 3 to 100, and the maximum m is preferably 40.

Exemplary linear poly(organohydrosiloxanes) include:

trimethylsiloxy-terminated methylhydropolysiloxane, dimethylsiloxy-terminated methlyhydrosiloxane, trimethylsiloxy-terminated dimethylsiloxane-methylhydrosiloxane copolymer, dimethylsiloxy-terminated dimethylsiloxane-methylhydrosiloxane copolymer, dimethylsiloxy-terminated polydimethylsiloxane, trimethylsiloxy-terminated methyloctylsiloxane-methylhydro-siloxane copolymer, dimethylsiloxy-terminated phenylmethylsiloxane-methylhydro-siloxane copolymer, trimethylsiloxy-terminated methylcyanopropyl-siloxane-methylhydrosiloxane copolymer, trimethylsiloxy-terminated 3,3,3-trifluoropropyl-methylsiloxane methylhydrosiloxane copolymer, trimethylsiloxy-terminated 3-aminopropylmethyl siloxane-methylhydrosiloxane copolymer, trimethylsiloxy-terminated 2-phenylethylmethylsiloxane methylhydrosiloxane copolymer, and trimethylsiloxy-terminated 2-(4-methylphenyl)ethyl-methyl-siloxane-methylhydrosiloxane copolymer.

Polycyclic polyenes useful in preparing the composition of this invention are polycyclic hydrocarbon compounds having at least two non-aromatic, non-conjugated, carbon-carbon double bonds. Illustrative are compounds selected from the group consisting of cyclopentadiene oligomers (e.g., dicyclopentadiene, tricyclopentadiene and tetracyclopentadiene), norbornadiene dimer, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes. Preferred are cyclopentadiene oligomers, such as dicyclopentadiene and tricylopentadiene. Two or more polycyclic polyenes can be used in combination.

Other hydrocarbon compounds may also be used. For instance according to one embodiment described in U.S. patent application Ser. No. 07/422,214 (U.S. Pat. No. 5,008,360), supra, the hydrocarbon component comprises (a) at least one low molecular weight (typically having a molecular weight less than 1,000, preferably less than 500) polyene having at least two non-aromatic, non-conjugated, carbon-carbon double bonds highly reactive in hydrosilation (they may contain other less reactive (including unreactive) double-bonds, provided that those double bonds do not interfere with the reactivity of the highly reactive double bonds; but, compounds having only two highly reactive double bonds are preferred), the carbon-carbon double bonds being either in an alpha, beta or gamma position on a linear carbon moiety, next to two bridgehead positions in a strained polycyclic aliphatic ring structure, or in a cyclobutene ring, and (b) at least one polycyclic polyene having at least two chemically distinguishable non-aromatic, non-conjugated carbon-carbon double bonds in its rings. Examples of component (a) include 5-vinyl-2-norbornene, o-, m- or p-diisopropenylbenzene, o-, m- or p-divinylbenzene, diallyl ether, diallyl benzene, dimethanohexahydronaphthalene and the symmetrical isomer of tricyclopentadiene. By "having at least two chemically distinguishable carbon-carbon double bonds" it is meant that at least two carbon-carbon double bonds have widely different rates of reaction in hydrosilation and that one of the double bonds will react prior to substantial reaction of the other double bonds(s). This first double bond must be quite reactive in hydrosilation. Reactive double bonds include those that are next to two bridgehead positions in a strained polycyclic aliphatic ring structure or in a cyclobutene ring, as per component (a) of the embodiment described directly above. The other carbon-carbon double bond(s) may be any other non-aromatic, 1,2-disubstituted non-conjugated carbon-carbon double bond that is not next to two bridgehead positions in a strained polycyclic aliphatic ring structure and is not in a cyclobutene ring. Exemplary are dicyclopentadiene and the asymmetrical isomer of tricyclopentadiene. Preferred, for some applications, when using these hydrocarbon compounds are cyclic polysiloxanes containing three or more SiH groups.

The reactions for forming the organosilicon prepolymers and polymers of this invention are described in U.S. patent application Ser. Nos. 07/419,429, 07/419/430 and 07/422,214 (U.S. Pat. Nos. 5,013,809, 5,077,134 and 5,008,360, respectively), and U.S. Pat. Nos. 4,877,820, 4,900,779 and 4,902,731, supra. The reactions for forming the prepolymer and for forming a polymer from the prepolymer can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum (e.g., $PtCl_2$, dibenzonitrile platinum dichloride, platinum on carbon, etc.). The preferred catalyst, in terms of both reactivity and cost, is chloroplatinic acid ($H_2PtCl_6.6H_2O$). Catalyst concentrations of 0.0005 to about 0.05% by weight of platinum, based on the weight of the monomers, are preferred.

To prepare the thermoset and thermoplastic polymers, several approaches are available. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In one approach, the correct relative ratios of reactants and the platinum catalyst are simply mixed and brought to a temperature at which the reaction is initiated and proper temperature conditions are thereafter maintained to drive the reaction to substantial completion (typically, with a ratio of carbon-carbon double bonds to SiH groups of about 1:1, when 70 to 90% of the SiH groups are consumed).

Generally, with cyclic polysiloxanes or tetrahedral siloxysilanes, thermoset polymers result when the ratio of carbon-carbon double bonds of (b) to SiH groups in (a) is in the range of from about 0.5:1 up to about 1.3:1, more preferably from about 0.8:1 up to about 1.1:1. The alternating residues form a cross-linked thermoset structure.

B-stage type prepolymers can be prepared as disclosed in U.S. patent application Ser. No. 07/422,214 (U.S. Pat. No. 5,008,360), and U.S. Pat. Nos. 4,877,820 and 4,902,731, supra. Generally, the initial product of the reaction at lower temperatures, e.g., about 25° to about 80° C., is a crosslinkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers, analogous to the so-called B-stage resins encountered in other thermoset preparations, can be recovered and subsequently transferred to a mold for curing.

These prepolymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene. Such prepolymers can also be prepared with the hydrocarbon combinations described in U.S. patent application Ser. No. 07/422,214 (U.S. Pat. No. 5,008,360), supra.

The prepolymers, including the viscous, flowable liquid prepolymers, are stable at room temperature for varying periods of time, and cure upon reheating to an appropriate temperature, e.g., about 100° to about 250° C. Often, additional catalyst is added to the prepolymer prior to cure to further promote the reaction.

A second type of prepolymer can be prepared by a process described in U.S. patent application Ser. Nos. 07/419,429 and 07/419,430 (U.S. Pat. Nos. 5,013,809 and 5,077,134, respectively). In this process, an olefin rich prepolymer is prepared by reacting a large excess of polycyclic polymers with cyclic siloxanes or tetrahedral siloxysilanes. The olefin rich organosilicon prepolymer is blended with additional cyclic polysiloxane or tetrahedral siloxysilane before cure.

According to this process, organosilicon prepolymers are made with a large excess of carbon-carbon double bonds available for reaction with SiH groups. That is, the ratio of carbon-carbon double bonds in the rings of the polycyclic polyenes used to form the polycyclic polyene residues (a) to SiH groups in the cyclic polysiloxanes and tetrahedral siloxysilanes used to form the cyclic polysiloxane or tethrahedral siloxysilane residues (b) is greater than 1.8:1, preferably greater than 1.8:1 and up to 2.2:1.

The prepolymers of this embodiment are generally in the form of flowable liquids, which are stable at room temperature. The most stable prepolymers are formed at a double bond to SiH ratio of about 2:1 since virtually all polyene is reacted and excess polycyclic polyene need not be removed. (Due to their odor, the presence of unreacted polycyclic polyenes is undesirable. When necessary or desirable, unreacted polycyclic polyenes can be stripped, e.g., using a rotoevaporator, to form odorless compositions.)

Later, crosslinked polymers are formed by mixing the prepolymers with the polysiloxanes/siloxysilanes such that the total ratio of non-aromatic, non-conjugated carbon-carbon double bonds in the rings of the polycyclic polyenes used to form the polycyclic polyene residues (a) to SiH groups in the polysiloxanes and siloxysilanes used to form the polysiloxane/siloxysilane residues (b) is in the ratio of 0.4:1 to 1.7:1; preferably 0.8:1 to 1.3:1, most preferably about 1:1, and curing the mixture in the presence of a hydrosilation catalyst.

Preferably, according to this embodiment, the organosilicon prepolymers are reacted with the polysiloxanes and/or siloxysilanes to form a crosslinked polymer in a mold. The prepolymers and polysiloxanes/siloxysilanes are stored separately and are blended before entering the mold. The hydrosilation catalyst may be present in either or both stream(s) or injected directly into the mixer. The reaction is exothermic and proceeds rapidly so that the polymer gels and the product can be removed from the mold in minutes. The components of the blends are completely stable until they are mixed. This permits indefinite ambient storage of the materials.

Alternately, the blend components can be premixed and stirred in a tank. These blends have low viscosity and are pumpable. Addition of catalyst and/or application of heat can be used to cure the prepolymer composition. The reaction may be carried out in an extruder, mold or oven, or the blend may be applied directly on a substrate or part.

With all of the above processes, the reaction speed and its accompanying viscosity increase can be controlled by use of a cure rate retardant (complexing agent), such as N,N,N',N'-tetramethylethylenediamine, diethylenetriamine or phosphorus compounds.

A number of options exist for incorporating additives into the prepolymers or polymers of this invention. Additives such as fillers and pigments are readily incorporated. Carbon black, vermiculite, mica, wollastonite, calcium carbonate, silica, fused silica, fumed silica, glass spheres, glass beads, ground glass and waste glass are examples fillers which can be incorporated. Fillers can serve either as reinforcement or as fillers and extenders to reduce the cost of the molded product. Glass spheres are useful for preparing low density composites. When used, fillers can be present in amounts up to about 85%.

Fiber reinforced composites may be made with the prepolymers of this invention. They can contain as much as 80%, preferably 30 to 60%, by weight, of fibrous reinforcement. Fibrous reinforcement useful in this invention includes glass, etc., as described in U.S. Pat. Nos. 4,877,820, 4,900,779 and 4,902,731.

Stablizers (antioxidants) are useful to maintain storage stability of B stage materials and thermal oxidative stability of the final product. Preferred are bis(1,2,2,6,6-pentamethyl-4-piperidinyl)-(3,5-di-tert-butyl-4-hydroxybenzyl)butylpropanedioate, (available as Tinuvin ™ 144 from Ciba-Geigy Corp., Hawthorne, N.Y.) or a combination of octadecyl 3,5-di-tert-butyl-4-hydroxyhydrocinnamate (also known as octadecyl 3-(3',5'-di-tert-butyl-4'-hydroxyphenyl)propionate) (available as Naugard ™ 76 from Uniroyal Chemical Co., Middlebury, Conn.) and bis(1,2,2,6,6-pentamethyl-4-piperidinylsebacate) (available as Tinuvin 765 ™ from Ciba-Geigy Corp.).

The polymers of this invention have excellent electrical insulating properties and resistance to moisture. Often, they have high glass transition temperatures.

The polymers and prepolymers of this invention are well-suited for electronic applications, e.g., composites, adhesives, encapsulants, potting compounds and coatings. They are especially useful for preparing laminates, such as those used for printed circuit boards.

Use of the elastomers of this invention improves the toughness of the cured polymer, without significantly affecting other properties. That is, there is not a significant effect on the dielectric constant, glass transition temperature or thermal coefficient of expansion. These properties make the resins useful in the preparation of composites, coatings, adhesives, circuit board laminates, molded circuit boards, encapsulants and potting resins.

The diphenyl dimethyl elastomers also improve adhesive strength (e.g., adhesion of copper foil to circuit board laminate).

In order for an elastomer to be effective in toughening the glassy polymer without significantly affecting other properties, there are several requirements. First, there is a reaction between the prepolymer and elastomer in order for there to be adhesion between phases of the polymer. Second, the polymer and elastomer should form two phases.

In order to obtain the desired product, the elastomer should have two or more reactive groups selected from the group consisting of hydrosilation reactable carbon-carbon double bonds.

Suitable results have been obtained with elastomers that are soluble or insoluble in liquid prepolymer. However, dispersability in liquid prepolymer is desirable for storage stability, since it is preferable that the mixture does not separate during storage.

The preferred siloxane elastomers have a molecular weight of less than 200,000. Preferred siloxane rubbers siloxane polymers of the structure:

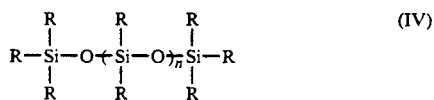

(IV)

wherein R is selected from the group consisting of substituted or unsubstituted alkyl, alkenyl and aryl, methacryloxy propyl and acryloxy propyl groups and at least two of the R's contain a hydrosilation reactable carbon-carbon double bond, n is 10 to 2800 and the molecular weight is 1,000 to 200,000, preferably 2,000 to 50,000, and most preferably 3,000 to 20,000. R is preferably selected from the group consisting of $C_1$ to $C_3$ alkyl, which may be unsubstituted or substituted with Cl, F or Br; $C_5$ and $C_6$ aryl, methacryloxy propyl, acryloxy propyl and —CH=CH$_2$. R is most preferably selected from the group consisting of —CH$_3$, —C$_6$H$_5$ and —CH=CH$_2$. Preferred polymers are vinyl dimethyl or divinyl methyl terminated. The most preferred polymers are vinyl dimethyl terminated and consist essentially of dimethyl and diphenyl siloxane repeating units. Preferably they have 75–90 mole % dimethyl and 25–10 mole % diphenyl siloxane repeat units.

Elastomers having large numbers of double bonds tend to react with the prepolymer to form a one phase system. Preferably, the elastomer should have at least two and no more than 40 mole % of the repeat units with >C=C<, preferably no more than 25 mole % >C=C<, and most preferably no more than 15 mole % >C=C<.

The elastomer is preferably present as micron-sized particles forming a secondary phase. The particles are in the range of 0.001 to 50 micron in diameter, preferably 0.01 to 10 micron in diameter, and most preferably 0.1 to 5 micron in diameter.

Elastomer is generally used in an amount of 1 to 20%, preferably 1 to 12%, and most preferably 2 to 10%, by weight.

Elastomer may be added to the prepolymer or during prepolymer synthesis.

The following examples, wherein all parts, percentages, etc., are by weight, illustrate the invention.

EXAMPLE 1 (CONTROL)

This example demonstrates preparation of prepolymer, stripping and curing, and test procedures.

A prepolymer solution was produced as follows. To a glass container was added 111.1 parts DCPD, 2.1 parts DCPD/CPA catalyst concentrate (0.275 weight % Pt in DCPD) and 55.9 parts toluene. This mixture was heated to 50° C. for 1 hour and then cooled to room temperature to form mixture B. Mixture A was prepared by combining 110.8 parts MHCS, 4.26 parts Naugard TM 76 and 0.85 parts Tinuvin TM 765 in a glass container. Mixture A was heated to 70° C., and mixture B was added dropwise with stirring to maintain a reaction temperature less than 100° C. The reaction solution was heated at 70° C. after addition was complete. The reaction was considered complete when 99% of the norbornene carbon-carbon double bonds of the DCPD were reacted (as shown by NMR).

The prepolymer solution was activated with 10 ppm Pt as PC072 (Huls America, Bristol, Pa.) to give a gel time of 2 minutes 1 second at 160° C. The prepolymer was stripped 2 hours at 40°–50° C. in a rotary evaporator to remove 99% of the toluene. The prepolymer was then poured into a 100° C. preheated aluminum mold and placed in a programmable oven for cure with an nitrogen purge. The cure cycle was heating from room temperature to 160° C. at 2° C./min, holding at 160° C. for 1 hour, heating from 160° C. to 250° C. at 1° C./min, holding at 250° C. for 4 hours, and cooling slowly in the oven to room temperature over 12 hours. The resulting plaque was transparent.

Samples were cut from the cured plaque with a diamond saw and tested for: (1) Tg and thermal expansion coefficient by thermal mechanical analyzer (TMA), (2) flex modulus and strength according to ASTM D790, (3) phase morphology by transmission electron microscopy (TEM), and (4) $G_{Ic}$ fracture toughness by a double torsion test (See, for example, A. J. Kinloch and R. J. Young, Fracture Behavior of Polymers, Applied Science Publishers, New York, 1983.) in the Examples.

The double torsion tests were carried out as follows: First, the plaques were cut into 1.5 inch by 4.5 inch by 0.125 inch samples. On both sides of the rectangles, a 45 degree groove was cut down the center lengthwise with a 45 degree diamond wheel. The groove was beveled at a depth of 30% of the samples thickness, except that it was beveled to a maximum depth of 35% of the total thickness starting 0.75 inches from one end of the rectangle. The resulting sample is illustrated in FIG. 1.

Figure 2:
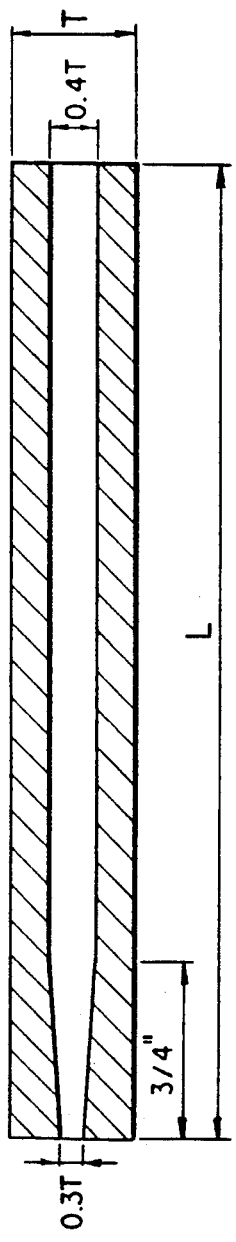
FIG. 2 is a side view of the sample. The end to the left of the figure is the precrack end.
Figure 3:
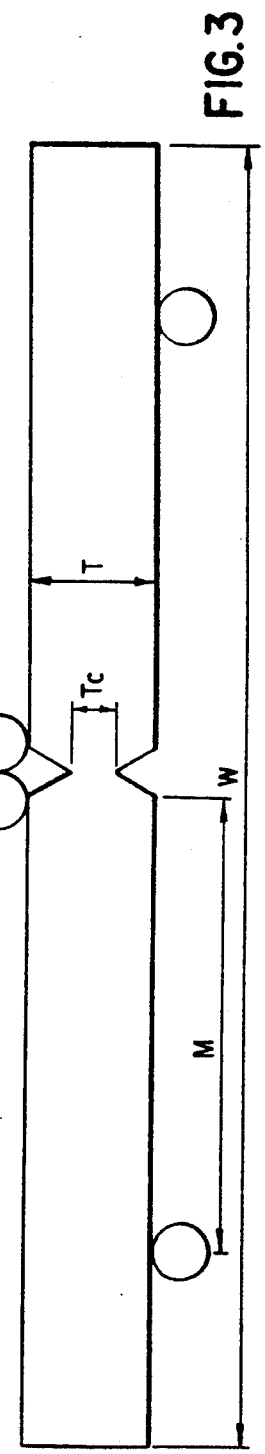
FIG. 3 illustrates the testing of the samples in double torsion.

The groove was such that one end had a reduced thickness section, shown on a side view in FIG. 2. The sample was then precracked at the end bevelled to a depth of 35% of the thickness, by tapping a razor blade into the end. The beveled groove prevents the precrack from propagating the length of the sample before testing. The sample was then tested in double torsion as illustrated in FIG. 3. Typically there was stop/start propagation of the crack so that several peak loads, Pc, could be measured for each sample. The mode I fraction toughness, $G_{Ic}$, was calculated according to:

$$G_{Ic} = 3 Pc^2 M^2 / 2 Tc T^3 WG$$

where
Pc = peak load
M = moment arm = 12.7 mm
Tc = reduced thickness = 1/20 inch
T = total thickness = ⅛ inch
G = shear modulus, taken = 0.9 GPa for all samples
W = specimen width = 1.5 inch
All dimensions were measured by a digital micrometer. The results are shown in Table 1.

EXAMPLE 2 (INVENTION)

This demonstrates addition of siloxane elastomer to prepolymer and effects of molecular weight and diphenyl content on phase behavior.

To 95 parts of an activated prepolymer solution with composition as in Example 1 was added 5 parts of a vinyl dimethyl terminated diphenyl dimethyl siloxane elastomer. The mixture was stirred for 15 hours at room temperature and then rotovaped and cured as in Example 1. Table 2 shows the characteristics of the siloxanes used. Table 3 shows the phase behavior of the siloxane elastomers as judged visually (transparent means single phase, cloudy means 2 phases).

The results indicate that very low molecular weights can lead to a single phase cured system, which is undesirable with regard to toughening. The results also indicate that increasing diphenyl content can give a single phase system before cure and a phase separated system after cure. A single phase prepolymer mixture insures against large scale separation during storage. Increasing the solubility in this way can also affect the cured particle size (smaller) and thus allow elastomer particle size control.

EXAMPLE 3 (INVENTION)

This example demonstrates the effectiveness of a siloxane elastomer in increasing the fracture toughness.

To 95 parts of the activated prepolymer solution of Example 1 was added 5 parts PS5. The mixture was stirred 15 hours at room temperature and then rotovaped, cured, and tested as in Example 1. Table 1 shows the results.

The fracture toughness increases from 54 to 74 J/m² with the addition of 5% siloxane elastomer. Tg, thermal expansion, and modulus are not altered to any large extent.

TABLE 1

| Property | Examples 1 and 3 | |
|---|---|---|
| | No Elastomer (Example 1) | 5% PS5 (Example 3) |
| Solubility in Prepolymer | — | Soluble |
| Phases after cure/ TEM[1] Domain Size (microns) | 1/— | 2/0.1–0.7 |
| Tg (°C.)[2] | 146.3 | 159.5 |
| CTE (ppm/°C.)[3] | 137 | 126 |
| Flex Modulus (1000 psi) | 302 | 264 |
| Flex Strength (psi) | 8900 | 8700 |
| Flex Strain (%) | 3.9 | 4.8 |
| Toughness (J/m²) | 53.6 | 74 |

TABLE 1-continued

| Property | Examples 1 and 3 | |
|---|---|---|
| | No Elastomer (Example 1) | 5% PS5 (Example 3) |

1. Transmission Electron Microscopy.
2. Glass transition temperature.
3. Coefficient of thermal expansion over 30–246° C.

TABLE 2

Vinyldimethyl Terminated Polydimethyl/diphenyl Siloxane Elastomers

| Elastomer | Viscosity (cp) | Molecular Weight | % Diphenyl |
|---|---|---|---|
| PS1 | 7–10 | 1000 | 0 |
| PS2 | 100 | 6000 | 0 |
| PS3 | 500 | — | 2.5–3.5 |
| PS4 | 500 | — | 4–6 |
| PS5 | 500 | — | 15–17 |
| PS6 | 1000–2000 | — | 22–25 |

TABLE 3

(Example 2)

| Elastomer | Solubility in Resin Solution | Solubility in Resin | Phases on Cure |
|---|---|---|---|
| PS1 | Soluble | Soluble | 1 |
| PS2 | Insoluble | Insoluble | 2 |
| PS3 | Insoluble | Insoluble | 2 |
| PS4 | Insoluble | Insoluble | 2 |
| PS5 | Soluble | Soluble | 2 |
| PS6 | Soluble | Soluble | 2 |

While the invention has been described with respect to specific embodiments, it should be understood that they are not intended to be limiting and that many variations and modifications are possible without departing from the scope and spirit of this invention.

What we claim is:

1. A composition comprising (A) a continuous phase of (i) a crosslinked organosilicon polymer or crosslinkable organosilicon prepolymer comprising alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has more than two reactive sites; or (ii) a crosslinked or crosslinkable linear poly(organohydrosiloxane) polymer having at least 30% of its ≡SiH groups reacted to hydrocarbon residues derived from polycyclic polyenes having at least two non-aromatic, non-conjugated carbon-carbon double bonds in their rings; and (B) a discontinuous phase of a low molecular weight siloxane elastomer having at least two hydrosilation reactable carbon-carbon double bonds.

2. A composition as claimed in claim 1 which contains 1 to 20 weight % of the elastomer.

3. A composition as claimed in claim 1 which contains 1 to 12 weight % of the elastomer.

4. A composition as claimed in claim 1 which contains 2 to 10 weight % of the elastomer.

5. A composition as claimed in claim 1 wherein the continuous phase consists essentially of the crosslinked organosilicon polymer (i) and the residues (a) are derived from the cyclic polysiloxane.

6. A composition as claimed in claim 1 wherein the continuous phase consists essentially of the crosslinked organosilicon polymer (i) and the residues (a) are derived from the tetrahedral siloxysilanes.

7. A composition as claimed in claim 1 wherein the polycyclic hydrocarbon residues are derived from polycyclic hydrocarbon compounds selected from the group consisting of cyclopentadiene oligomers, norbornadiene, norbornadiene dimer, Diels-Alder oligomers of bicycloheptadiene with cyclopentadiene, and substituted derivatives of any of these.

8. A composition as claimed in claim 5 wherein the polycyclic hydrocarbon residues are derived from polycyclic hydrocarbon compounds selected from the group consisting of dicyclopentadiene, methyl dicyclopentadiene and tricylopentadiene.

9. A composition as claimed in claim 1 wherein the elastomer is present as particles of 0.001 to 50 micron diameter.

10. A composition as claimed in claim 1 wherein the elastomer is present as particles of 0.1 to 5 micron diameter.

11. A composition as claimed in claim 1 wherein the elastomer has the structure:

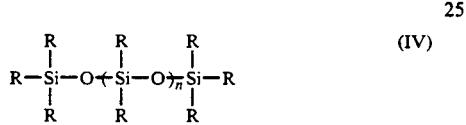

wherein R is selected from the group consisting of substituted or unsubstituted alkyl, aryl, or alkenyl, and methacryloxy propyl and acryloxy propyl groups, and at least two of the R's contain a hydrosilation reactable carbon-carbon double bond, n is 10 to 2800, and the molecular weight is 1,000 to 200,000.

12. A composition as claimed in claim 11 wherein R is selected from the group consisting of $C_1$ to $C_3$ alkyl, which may be unsubstituted or substituted with Cl, F or Br; $C_5$ and $C_6$ aryl, methacryloxy propyl and acryloxy propyl and —CH=$CH_2$, and the molecular weight is 2,000 to 50,000.

13. A composition as claimed in claim 11 wherein R is selected from the group consisting of —$CH_3$, —$C_6H_5$ and —CH=$CH_2$, and the molecular weight is 2,000 to 50,000.

14. A composition as claimed in claim 13 wherein the structure (IV) is vinyl siloxane or divinyl siloxane terminated.

15. A composition as claimed in claim 13 wherein the structure (IV) is vinyl dimethyl terminated and consists essentially of dimethyl and diphenyl siloxane repeating units, and the molecular weight is 3,000 to 20,000.

16. A composition as claimed in claim 1, wherein the composition comprises a crosslinked organosilicon polymer or crosslinkable organosilicon prepolymer comprising residues derived from (a) a polyene having a molecular weight less than 500 having two non-aromatic carbon-carbon double bonds highly reactive in hydrosilation, the carbon-carbon double bonds being either in an alpha, beta or gamma position on a linear carbon moiety, next to two bridgehead positions in a strained polycyclic aliphatic ring structure, or in a cyclobutene ring; (b) a polycyclic polyene having two chemically distinguishable non-aromatic, non-conjugated carbon-carbon double bonds in its rings; and (c) a cyclic polysiloxane containing three or more SiH groups.

17. A composition as claimed in claim 16 wherein the elastomer has the structure:

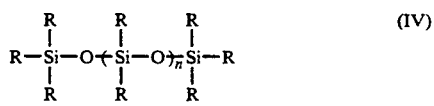

wherein R is selected from the group consisting of unsubstituted or substituted alkyl, alkenyl and aryl groups, and methacryloxy propyl and acryloxy propyl groups, and at least two of the R's contain a hydrosilation reactable carbon-carbon double bond, n is 10 to 2800, and the molecular weight is 1,000 to 200,000.

18. A composition as claimed in claim 1 wherein no more than 40 mole % of the repeat units of the elastomer contain >C=C<.

19. A composition as claimed in claim 1 wherein no more than 25 mole % of the repeat units of the elastomer contain >C=C<.

20. A composition as claimed in claim 1 wherein no more than 15 mole % of the repeat units of the elastomer contain >C=C<.

21. A composition as claimed in claim 17 wherein R is selected from the group consisting of —$CH_3$, —$C_6H_5$ and —CH=$CH_2$; and the structure (IV) is vinyl dimethyl terminated and consists essentially of dimethyl and diphenyl repeating units; and the molecular weight is 3,000 to 20,000.

* * * * *